United States Patent
Honda et al.

(10) Patent No.: US 9,696,463 B2
(45) Date of Patent: Jul. 4, 2017

(54) ANTIGLARE FILM, POLARIZER, AND IMAGE DISPLAY DEVICE

(75) Inventors: Makoto Honda, Tokyo (JP); Hiroko Suzuki, Tokyo (JP); Gen Furui, Tokyo (JP); Takashi Kodama, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 14/240,920

(22) PCT Filed: Aug. 28, 2012

(86) PCT No.: PCT/JP2012/071696
§ 371 (c)(1),
(2), (4) Date: May 20, 2014

(87) PCT Pub. No.: WO2013/031766
PCT Pub. Date: Mar. 7, 2013

(65) Prior Publication Data
US 2014/0247495 A1    Sep. 4, 2014

(30) Foreign Application Priority Data
Aug. 29, 2011  (JP) .................................. 2011-186246

(51) Int. Cl.
G02B 5/02  (2006.01)
G02F 1/1335  (2006.01)

(52) U.S. Cl.
CPC ........... *G02B 5/021* (2013.01); *G02B 5/0221* (2013.01); *G02B 5/0226* (2013.01); *G02F 1/133502* (2013.01); *G02F 2201/38* (2013.01)

(58) Field of Classification Search
CPC .... G02B 5/021; G02B 5/0221; G02B 5/0226; G02B 5/30; G02B 1/11; G02B 5/0231;
(Continued)

(56) References Cited

U.S. PATENT DOCUMENTS

| 2003/0081320 | A1 | 5/2003 | Sakai et al. |
| 2009/0086326 | A1* | 4/2009 | Hamamoto ....... G02F 1/133502 359/601 |
| 2010/0027127 | A1 | 2/2010 | Ooe et al. |
| 2010/0195311 | A1* | 8/2010 | Furui et al. ................. 362/97.1 |
| 2010/0283945 | A1 | 11/2010 | Kodama et al. |
| 2013/0027641 | A1* | 1/2013 | Kodama ............. G02B 5/0221 349/96 |

FOREIGN PATENT DOCUMENTS

| CN | 1740826 | 3/2006 |
| JP | 6-018706 | 1/1994 |

(Continued)

*Primary Examiner* — Thomas K Pham
*Assistant Examiner* — Ibrahima Diedhiou
(74) *Attorney, Agent, or Firm* — Hamre, Schumann, Mueller & Larson, P.C.

(57) ABSTRACT

The present invention provides an antiglare film that has a thin antiglare layer and suppresses generation of scintillation and white muddiness at significantly high levels, while maintaining the hard-coating property and antiglare property, thereby providing favorable high-contrast display images. The present invention is an antiglare film including: a light-transmitting substrate; and an antiglare layer that has surface roughness and is provided on one face of the light-transmitting substrate, wherein the antiglare layer has plural rod-shaped projections having an aspect ratio of at least 2 on the opposite side of the surface contacting the light-transmitting substrate, the projections of the antiglare layer occupy 20 to 40%, per unit area, of the opposite side of the surface contacting the light-transmitting substrate, and $N_T$ indicating the number of all projections and $N_S$ indicating the number of rod-shaped projections among all the projections, per unit area of the surface of the antiglare layer, satisfy the following formula (1):

$$N_S/N_T > 0.2 \qquad (1).$$

8 Claims, 2 Drawing Sheets

(58) Field of Classification Search
CPC .... G02B 27/0018; G02B 5/02; G02B 5/0242; G02F 1/133502; G02F 1/133528; G02F 2001/133531; G02F 1/133536; G02F 1/13362; G02F 2201/38; G02F 2201/40; G02F 2201/42; G02F 2201/44
USPC ............... 359/599, 601, 614, 488.01; 428/14
See application file for complete search history.

(56) References Cited

FOREIGN PATENT DOCUMENTS

| | | | |
|---|---|---|---|
| JP | 10-020103 | | 1/1998 |
| JP | 2000-304648 | | 11/2000 |
| JP | 2008-225195 | | 9/2008 |
| JP | 2008225195 | A * | 9/2008 |
| JP | 2008-262190 | | 10/2008 |
| JP | 2008-276198 | | 11/2008 |
| JP | 2008-304638 | | 12/2008 |
| JP | 2009-086361 | | 4/2009 |
| JP | 2009-237507 | | 10/2009 |
| JP | 2010-044238 | | 2/2010 |
| JP | 2011-017829 | | 1/2011 |
| JP | 2011-022266 | | 2/2011 |
| JP | 20011-098445 | | 5/2011 |
| JP | 4788830 | B | 10/2011 |
| JP | 2012-181504 | | 9/2012 |
| WO | 2010/047298 | | 4/2010 |

\* cited by examiner

ANTIGLARE FILM, POLARIZER, AND IMAGE DISPLAY DEVICE

TECHNICAL FIELD

The present invention relates to an antiglare film, a polarizer, and an image display device.

BACKGROUND ART

An optical layered body is commonly provided on the outermost surface of an image display device, such as cathode ray tube displays (CRT), liquid crystal displays (LCD), plasma displays (PDP), and electroluminescent displays (ELD), for antireflection.

Such an optical layered body for antireflection suppresses reflection of images and lowers the reflectance by light diffusion or light interference.

A known optical layered body for antireflection is an antiglare film including a transparent substrate and an antiglare layer with surface roughness provided on the surface of the transparent substrate. Surface roughness on the surface of such an antiglare film diffuse external light, thereby preventing reduction in visibility due to reflection of external light and reflection of images.

An optical layered body is commonly provided on the outermost surface of an image display device, and therefore is required to have a hard-coating property for avoiding scratches formed during handling thereof.

Conventionally known antiglare films are formed, for example, by applying a resin containing a filler such as silicon dioxide (silica) to the surface of a light-transmitting substrate to form an antiglare layer thereon (see Patent Literatures 1 and 2, for example).

Surface roughness of such antiglare films is formed by the following methods. Particles such as aggregative silica particles are aggregated to form surface roughness on the surface of the antiglare layer. An organic filler or the like having a particle size of not smaller than the thickness of a coating film to be formed is added to a resin to form surface roughness on the layer surface. An organic filler or the like having a particle size of not larger than the thickness of a coating film to be formed is added to a resin, so that surface roughness is formed on the layer surface by curing shrinkage of the resin at positions corresponding to the organic filler. A film having surface roughness on its surface is laminated to transfer projections and depressions. Each of these methods is employed alone or in combination with others.

These conventional antiglare films produce light diffusion/antiglare effects by surface features of the antiglare layer. Accordingly, to enhance the antiglare effect, projections and depressions need to be enlarged. An enlarged projections and depressions, however, increase the haze value of the film to cause white muddiness, problematically lowering the contrast of the displayed image.

Further, conventional antiglare films have flicker, so-called scintillation as disclosed in Patent Literature 3, on the film surface, problematically lowering the visibility of the display screen.

To solve the above problems, an antiglare film in which a hard coat layer and an antiglare layer are laminated is known (see Patent Literature 4, for example). An antireflection film having such a layered configuration suppresses scintillation and white muddiness, while maintaining the hard-coating property and the antiglare property. Such a film, however, is thick, failing to satisfy the recent demands for thinner antiglare films.

Accordingly, there has been a demand for an antireflection film including an antiglare layer with a monolayer structure that sufficiently suppresses scintillation and white muddiness, while maintaining the hard-coating property and antiglare property.

CITATION LIST

Patent Literature

Patent Literature 1: JP-A H06-18706
Patent Literature 2: JP-A H10-20103
Patent Literature 3: JP-A 2000-304648
Patent Literature 4: JP-A 2009-086361

SUMMARY OF INVENTION

Technical Problem

The present invention aims to provide, in consideration of the state of the art, an antiglare film that has a thin antiglare layer and suppresses generation of scintillation and white muddiness at significantly high levels, while maintaining the hard-coating property and antiglare property, thereby providing favorable high-contrast display images, and to provide a polarizer and an image display device each including the antiglare film.

Solution to Problem

The present invention relates to an antiglare film including: a light-transmitting substrate; and an antiglare layer that has surface roughness on the surface and is provided on one face of the light-transmitting substrate, wherein the antiglare layer has plural rod-shaped projections having an aspect ratio of at least 2 on the opposite side of the surface contacting the light-transmitting substrate, the projections of the antiglare layer occupy 20 to 40%, per unit area, of the opposite side of the surface contacting the light-transmitting substrate, and $N_T$ indicating the number of all projections and $N_S$ indicating the number of rod-shaped projections among all the projections, per unit area of the surface of the antiglare layer, satisfy the following formula (1):

$$N_S/N_T > 0.2 \quad (1).$$

In the antiglare film of the present invention, the $N_T$ and the $N_S$ preferably further satisfy the following formula (2):

$$N_S/N_T > 0.4 \quad (2).$$

Further, in the antiglare film of the present invention, $N_T$ indicating the number of all projections and $N_o$ indicating the number of projections having an area of at least 500 µm² among all the projections, per unit area of the opposite side of the surface of the antiglare layer contacting the light-transmitting substrate, satisfy the following formula (3):

$$N_C/N_T \geq 0.25 \quad (3).$$

The plural rod-shaped projections of the antiglare layer formed on the opposite side of the surface contacting the light-transmitting substrate preferably have their major axes randomly oriented.

The rod-shaped projections are preferably formed of aggregates of organic fine particles.

The antiglare layer preferably further contains inorganic fine particles. The inorganic fine particles are preferably formed of a layered inorganic compound.

The antiglare layer preferably has a thickness of 2.0 to 7.0 µm.

The present invention also relates to a polarizer including a polarizing element, which includes the antiglare film on a surface of the polarizing element.

The present invention further relates to an image display device including the antiglare film or the polarizer.

The present invention is specifically described below.

The present inventors have intensively studied about antiglare films including a light-transmitting substrate and an antiglare layer that has surface roughness on the surface and is provided on one surface of the substrate to find the following fact, thereby completing the present invention. In the case where the antiglare layer has a specific thickness and has specific rod-shaped projections among the surface roughness on the surface in a specific proportion, a resulting antiglare film suppresses generation of scintillation and white muddiness at significantly high levels, while maintaining the hard-coating property and antiglare property, thereby providing favorable high-contrast display images.

The antiglare film of the present invention includes a light-transmitting substrate and an antiglare layer that has surface roughness on the surface and is provided on one face of the light-transmitting substrate.

Preferably, the light-transmitting substrate is smooth and heat-resistant and has excellent mechanical strength. Specific examples of materials of the light-transmitting substrate include thermoplastic resins such as cellulose acylates, polyesters, polyamides, polyimides, polyether sulfones, polysulfones, polypropylenes, polycycloolefins, polymethylpentenes, polyvinyl chlorides, polyvinyl acetals, polyether ketones, polymethyl methacrylates, polycarbonates, or polyurethanes. Preferable are polyethylene terephthalate and cellulose triacetate.

The light-transmitting substrate is preferably a flexible film formed of any of the thermoplastic resins. In accordance with the applications that require curability, the substrate may be a plate formed of any of the thermoplastic resins or a glass plate.

In the case where the light-transmitting substrate is a film, the thickness thereof is preferably 20 to 300 μm. More preferably, the lower limit of the thickness is 30 μm and the upper limit thereof is 200 μm. In the case where the light-transmitting substrate is a plate, the thickness may exceed the above thickness of the film. Before formation of the hard coat layer and the like on the surface, the light-transmitting substrate may be subjected to, for the purpose of enhancing the adhesiveness, application of a coating composition called an anchoring agent or a primer, in addition to a physical or chemical treatment such as corona discharge treatment and oxidation treatment.

The antiglare layer is formed on one face of the light-transmitting substrate and has surface roughness on the opposite side of the surface contacting the light-transmitting substrate.

In the antiglare film of the present invention, the antiglare layer has plural rod-shaped projections having an aspect ratio of at least 2 on the surface.

The term "projections" herein refers to convex regions formed by slopes having an inclination angle of at least 0.7° observed on the surface of the antiglare layer under a microscope. Unless otherwise specified, "the surface of the antiglare layer" means the opposite side of the surface of the antiglare layer contacting the light-transmitting substrate.

Next, the term "inclination angle" is described.

Since the antiglare layer has a large number of fine projections and depressions formed on the surface, a local inclination angle at an arbitrary point on the surface of the antiglare layer varies, and the inclination angle is determined for each arbitrary point. The term "inclination angle" herein is defined to be the inclination angle relative to the average plane of the antiglare layer. The inclination angle is calculated as described below.

Rectangular coordinates (x, y) are set on the average plane (hereinafter, referred to as a plane T). A coordinate z is further set in the direction orthogonal to the plane T (i.e., the direction along the height of projections and depressions). An arbitrary point on the antiglare layer surface is represented by (x, y, z). In the case where the inclination angle of the point A is determined, the coordinates of the point A are set as $(x_i, y_j, z_A)$. The projected point of the point A on the plane T is set as a point a (the x and y coordinates of the point a are the same as the x and y coordinates of the point A).

Points b and c are plotted symmetrically about the point a, each at a minute distance δ from the point a along the direction parallel with the x axis passing through the point a. Points d and e are plotted in the same manner each at a minute distance δ from the point a along the direction parallel with the y axis passing through the point a (points b, c, d, and e are plotted on the plane T). The projected points of the points b, c, d, and e on the antiglare layer surface are set as points B, C, D, and E, respectively. The z coordinates thereof are set as $z_B$, $z_C$, $z_D$, and $z_E$ (the x and y coordinates of the points B, C, D, and E are the same as the x and y coordinates of the points b, c, d, and e, respectively). The coordinates of the points B, C, D, and E are mentioned below.

Point B: $(x_i-\delta, y_j, z_B)$
Point C: $(x_i+\delta, y_j, z_C)$
Point D: $(x_i, y_j-\delta, z_D)$
Point E: $(x_i, y_j+\delta, z_E)$ The inclination Sx at the point A relative to the x axis in the x direction and the inclination Sy at the point A relative to the y axis in the y direction are calculated based on the following formulae:

$$Sx=(z_C-z_B)/2\delta, \text{ and}$$

$$Sy=(z_E-z_D)/2\delta.$$

The inclination St at the point A relative to the plane T is calculated based on the following formula:

$$St=\sqrt{(Sx^2+Sy^2)}. \quad \text{[Mathematical Expression 1]}$$

The inclination angle at the point A is obtained as arctan (St)

The inclination angle is determined from three-dimensional information of the surface roughness determined with a confocal microscope, interference microscope, or atomic force microscope (AFM).

The device used in measurement of the inclination angle is required to have a horizontal resolution of at most 5 μm and preferably at most 2 μm, and an orthogonal resolution of at most 0.1 μm and preferably at most 0.01 μm.

Examples of a noncontact 3D surface profiler favorably used in measurement of the inclination angle include "Zygo New View 6000" series from Zygo Corporation. The area measured is preferably large, and is at least 200 μm×200 μm and preferably at least 500 μm×500 μm.

The term "rod-shaped projections" herein means that the "projections" have a rod-shaped profile on the plane of the antiglare layer.

The term "aspect ratio" refers to a major/minor axis ratio of an ellipse. The major/minor axis ratio of an ellipse can be obtained as the ratio between the major axis and the minor axis (major axis/minor axis) of an equivalent ellipse (an ellipse having the same area and the same first and the second moments in physics as those of the object) that is a projected shape of the "projection" on the average plane of the antiglare layer surface.

The major/minor axis ratio of an ellipse can be calculated using commercially available image-processing software. For example, Image-Pro Plus from Media Cybernetics, Inc. is suitably used.

In a comparison of the inclination angle between the periphery and the central portion (the top or near the top of the rod-shaped projection) of the rod-shaped projection reveals that the inclination angle at the periphery is larger than that at the central portion in the cross-sectional direction of the antiglare layer.

The rod-shaped projections have their major axes randomly oriented on the antiglare layer surface. Such rod-shaped projections on the antiglare layer surface reduce the amount of light diffusion without changing the amount of light reflection on the surface of the antiglare layer, thereby achieving both the antiglare property and prevention of white muddiness.

In conventional antiglare films, most projections formed on the antiglare layer surface have a non-rod shape such as a circular shape in a plan view, though the size thereof varies. On the antiglare layer with such projections formed thereon, the amount of light diffused by one projection is constant in all directions. Accordingly, in the case where the amount of light diffusion is reduced on the entire surface of the antiglare layer by decreasing the number of projections, the amount of light reflection on the surface of the antiglare layer increases.

In contrast, in the case where rod-shaped projections are formed on the surface of the antiglare layer, the amount of light diffused by one rod-shaped projection varies in accordance with the directions of light, enabling to reduce the amount of light diffusion in comparison with that of one non-rod-shaped projection. In the antiglare film of the present invention, such rod-shaped projections are provided on the surface of the antiglare layer with their major axes randomly oriented, and therefore, the amount of light diffusion can be reduced in comparison with the case where non-rod-shaped projections are formed, while the amount of light reflection on the entire surface of the antiglare layer is hardly changed.

Here, the state where "the rod-shaped projections have their major axes randomly oriented" refers to a state where inclinations (degrees) of major axes of the equivalent ellipses of the rod-shaped projections on the surface of the antiglare layer have a standard deviation of at least 40 degrees relative to the standard axis (Y axis (ordinate axis) of the image) of the antiglare layer image in measurement of the inclination in a range of 0 to 180 degrees.

The "equivalent ellipse" has been already mentioned in the description on the aspect ratio. The inclination (degree) of the major axis can be calculated as an "angle" using commercially available image processing software. For example, Image-Pro Plus from Media Cybernetics, Inc. is suitably used. The standard deviation can be calculated using commercially available spread sheet software such as Excel (registered trade mark) based on the "angle" obtained using commercially available image processing software.

In the antiglare film of the present invention, non-rod-shaped projections may be formed, in addition to the rod-shaped projections, on the surface of the antiglare layer. Such non-rod-shaped projections may be formed by a conventionally known method, and examples thereof include projections formed by organic fine particles contained in the antiglare layer without being aggregated, and projections formed by inorganic fine particles, which will be described later.

In the antiglare film of the present invention, projections occupy 20 to 40%, per unit area, of the surface of the antiglare layer. If projections occupy less than 20% of the surface of the antiglare layer, the antiglare layer surface has a large flat region to increase the amount of regular reflection too much, resulting in the insufficient antiglare property of the antiglare film of the present invention. If projections occupy more than 40% of the surface of the antiglare layer, the amount of regular reflection is too small, resulting in poorer prevention of white muddiness, in addition to reduced luminance and worse blurring of images compared to the original quality of the image source.

In the antiglare layer, $N_T$ representing the number of all projections and $N_S$ indicating the number of rod-shaped projections among all the projections, per unit area of the surface, satisfy the following formula (1):

$$N_S/N_T > 0.2 \tag{1}$$

The formula (1) shows the proportion of the rod-shaped projections in all the projections formed on the surface of the antiglare layer. When the $N_S/N_T$ is at most 0.2, that is, when the proportion of the rod-shaped projections is at most 20% in all the projections formed on the surface of the antiglare layer, the proportion of non-rod-shaped projections in the projections formed on the surface of the antiglare layer is great, resulting in formation of the antiglare layer with the surface having many dot-shaped fine projections and depressions. In such a case, the amount of light diffusion on the surface of the antiglare layer becomes greater, resulting in poor prevention of white muddiness of the antiglare film of the present invention. Further, the antiglare property of the antiglare film of the present invention is also lowered to some extent.

The $N_S$ and the $N_T$ preferably satisfy the formula (2):

$$N_S/N_T > 0.4 \tag{2}$$

In the case where the formula (2) is satisfied, that is, when the proportion of the rod-shaped projections in all the projections formed on the surface of the antiglare layer is more than 40%, the effects mentioned above are more surely achieved.

In the antiglare film of the present invention, $N_T$ indicating the number of all projections and $N_C$ indicating the number of projections having an area of at least 500 $\mu m^2$ among all the projections, per unit area of the surface of the antiglare layer, preferably satisfy the formula (3):

$$N_C/N_T \geq 0.25 \tag{3}$$

The "projections having an area of at least 500 $\mu m^2$" of the present invention are projections of the size contributing to achievement of the antiglare property and prevention of white muddiness of the antiglare film of the present invention. Satisfaction of the formula (3), that is, formation of projections satisfying the above area range in a proportion of at least 25% in all the projections formed on the surface of the antiglare layer, significantly improves the antiglare property and prevention of white muddiness of the antiglare film of the present invention.

The $N_S$, $N_T$, and $N_C$ are determined using a device of "Zygo New View 6000" series and commercially available image processing software (e.g., Image-Pro Plus from Media Cybernetics).

The rod-shaped projections have an aspect ratio of at least two. The equivalent ellipse preferably has a major axis size of 20 to 250 µm and a minor axis size of 10 to 100 µm. If the major axis size is less than 20 µm, the proportion of the slope having a large inclination angle is too much increased in the rod-shaped projections, possibly lowering the contrast. If the major axis size is more than 250 µm, the antiglare property may have directivity.

If the minor axis size is less than 10 µm, dark lines or bright lines may be generated in stripes. If the minor axis size is more than 100 µm, the proportion of the slopes of a large inclination angle is too much decreased in the rod-shaped projections, lowering the antiglare property.

In the antiglare film of the present invention, the rod-shaped projections may be formed of rod-shaped fine particles, and are preferably formed of aggregates of organic fine particles. The rod-shaped projections formed of aggregates of organic fine particles suppress external diffusion due to the surface shape, and has a larger interfacial area between a binder resin described later and organic fine particles compared to rod-shaped fine particles, achieving internal diffusion more effectively. As a result, the scintillation is reduced and the contrast is improved at the same time.

The rod-shaped projections may be formed of aggregates of the organic fine particles and a layered inorganic compound described later. Such aggregates have an amorphous rod shape, not a clear rod shape or elliptical shape. Formation of rod-shaped projections from aggregates of organic fine particles having such a shape and a layered inorganic compound achieves the effects of the present invention more favorably.

The organic fine particles are preferably fine particles formed of at least one material selected from the group consisting of acrylic resins, polystyrene resins, styrene-acrylic copolymers, polyethylene resins, epoxy resins, silicone resins, polyvinylidene fluoride resins, and polyfluoroethylene resins. Among these, styrene-acrylic copolymer fine particles are suitably used.

The size of the organic fine particles is not limited, and the average particle size is preferably 1.0 to 7.0 µm. The organic fine particles with the average particle size of less than 1.0 µm may cause difficulty in formation of the rod-shaped projections. The organic fine particles with the average particle size of more than 7.0 µm may form large projections and depressions on the antiglare layer surface, causing a problem of scintillation. The lower limit of the average particle size is more preferably 1.5 µm, and the upper limit thereof is more preferably 5.0 µm.

The average particle size of the organic fine particles is determined by the Coulter counter method in measurement of the organic fine particles alone.

In contrast, the average particle size of organic fine particles in the antiglare layer is calculated as the average size of the cross sections of 30 arbitrary organic fine particles constituting rod-shaped projections in observation of the antiglare layer under a transmission optical microscope or, if the transmission optical microscopy is not appropriate, under a cross-sectional electron microscope (transmission type such as TEM or STEM is preferable).

In determination of the average particle size of the organic fine particles by transmission optical microscopy or cross-sectional electron microscopy, the particle size of the cross section of one organic fine particle is the average value of the maximum size and the minimum size of the particle. The cross section of one organic fine particle is sandwiched with two parallel lines, and the distance between the two lines is measured. The largest distance between the two lines is regarded as the maximum size, and the smallest distance between the two lines is regarded as the minimum size.

The refractive index difference between the organic fine particles and a later-described binder resin is preferably 0 to 0.15. The refractive index difference exceeding 0.15 may cause generation of white muddiness. The refractive index difference between the organic fine particles and a binder resin is more preferably 0 to 0.10.

The rod-shaped fine particles are not limited, and examples thereof include polymer fine particles produced by the method disclosed in JP-A 2009-1759 and polyacrylonitrile fine particles "TAFTIC YK series" from Toyobo co., Ltd. In the case that the rod-shaped projections are formed of a later-described inorganic compound, the rod-shaped fine particles may be a layered inorganic compound. Examples thereof include "MICRO ACE series" from NIPPON TALC CO., LTD.

In the antiglare film of the present invention, the antiglare layer preferably further contains inorganic fine particles.

The inorganic fine particles are not limited, and examples thereof include layered inorganic compounds such as smectites (e.g., montmorillonite, beidellite, nontronite, saponite, hectorite, sauconite, stevensite), vermiculite, halloysite, kaolinite, endellite, dickite, talc, pyrophyllite, mica, margarite, white mica, bronze mica, tetra-silicic mica, taeniolite, antigorite, chlorite, cookeite, and nantite. These layered inorganic compounds may be natural products or synthesized products. The layered inorganic compound may be subjected to organic surface treatment.

The average particle size of the inorganic fine particles is shown as the average particle size D50 (median size in particle size distribution) determined by laser diffraction scattering particle size distribution analysis, in measurement of the inorganic fine particles only. The particle size range is preferably 0.1 to 9 µm, and more preferably 0.3 to 5 µm.

In contrast, in measurement of the inorganic fine particles by observation of the cross section of the antiglare layer under an electron microscope or the like, the average particle size is preferably about 0.3 to 5 µm.

If the particle size is too small, formation of the rod-shaped projections on the antiglare layer surface is difficult. If the particle size is too large, the transparency of the entire antiglare film may be affected.

The particle size of the inorganic fine particles in the antiglare layer is calculated as the average size of the cross sections of 30 arbitrary inorganic fine particles in observation of the cross section of the antiglare layer under an electron microscope. The size of the cross section of the inorganic fine particle is the value measured in the same manner as in the case of measuring the Cross section of the organic fine particles mentioned above.

The inorganic fine particles are preferably a layered inorganic compound.

A layered inorganic compound suitable for the present invention has a thin flat shape, and appears acicular as illustrated in FIG. 5 in observation of the cross section under an electron microscope.

In the case where the rod-shaped projections are formed of aggregates of organic fine particles, the antiglare layer further containing a layered inorganic compound allows favorable formation of rod-shaped projections formed of the aggregates on the antiglare layer surface. Though the reason for this is not yet clarified, the above rod-shaped projections are presumably formed as follows. The layered inorganic compound can form aggregates having a directionality in the antiglare layer. Organic fine particles gather around the aggregates having a directionality to form aggregates, thereby forming the rod-shaped projections.

Examples of such a layered inorganic compound include the compounds mentioned above. In particular, talc is favorably used in the present invention.

In the antiglare film of the present invention, the average particle size of the layered inorganic compound is the average value of the above-mentioned major axis size and minor axis size of 30 acicular pieces of the layered inorganic compound measured in observation of the cross section of the antiglare layer under an electron microscope. The major axis size and minor axis size of the layered inorganic compound are values measured by the same method of measuring the largest size and smallest size of the cross section of the above-mentioned organic particles, respectively.

The amount of the inorganic fine particles is preferably 0.1 to 8.0 parts by mass based on 100 parts by mass of a later-described ionizing radiation-curable resin in the antiglare layer. If the amount is less than 0.1 part by mass, sufficient rod-shaped projections may not be formed on the antiglare layer surface. If the amount is more than 8.0 parts by mass, the transparency of the antiglare film of the present invention may be lowered. The lower limit of the amount is more preferably 1.0 part by mass and the upper limit of the amount is more preferably 6.0 parts by mass.

In the antiglare film of the present invention, the antiglare layer preferably includes a binder resin in which inorganic fine particles and one of aggregates of the organic fine particles and aggregates of the organic fine particles and the layered inorganic compound (hereinafter, these aggregates are correctively referred to as aggregates of organic fine particles) are dispersed.

The binder resin is preferably transparent, and is preferably obtained by, for example, curing an ionizing radiation-curable resin that is cured by UV light or electron beams, by UV light or electron beam irradiation.

The term "resin" herein covers, unless otherwise specified, monomers, oligomers, and polymers.

Examples of the ionizing radiation-curable resin include compounds having one or at least two unsaturated bonds, such as compounds having acrylate functional groups. Specific examples of the compounds having one unsaturated bond include ethyl(meth)acrylate, ethyl hexyl (meth)acrylate, styrene, methyl styrene, and N-vinyl pyrrolidone. Specific examples of the compounds having at least two unsaturated bonds include: polyfunctional compounds such as polymethylolpropane tri(meth)acrylate, hexanediol (meth)acrylate, tripropylene glycol di(meth)acrylate, diethylene glycol di(meth)acrylate, pentaerythritol tri(meth)acrylate, pentaerythritol tetra(meth)acrylate, dipentaerythritol hexa (meth)acrylate, 1,6-hexanediol di(meth)acrylate, and neopentyl glycol di(meth)acrylate; and reaction products of the above polyfunctional compounds and (meth)acrylates (e.g., poly(meth)acrylate esters of polyalcohols). The term "(meth)acyrylates" as used herein refers to methacrylate and acrylate.

In addition to the above compounds, also usable as the ionizing radiation-curable resins include relatively low molecular weight resins having unsaturated double bonds, such as polyester resins, polyether resins, acrylic resins, epoxy resins, urethane resins, alkyd resins, spiroacetal resins, polybutadiene resins, and polythiol polyene resins.

The ionizing radiation-curable resins may be used in combination with solvent-drying resins (resins that are formed into films only by drying, upon application thereof, solvents added for adjustment of the solids content, e.g., thermoplastic resins). The use in combination with solvent-drying resins effectively suppresses film defects on the face where the coating liquid is applied upon formation of the antiglare layer.

The solvent-drying resins usable in combination with the ionizing radiation-curable resins are not limited, and thermoplastic resins are commonly used.

The thermoplastic resins are not limited, and examples thereof include styrene resins, (meth)acrylic resins, vinyl acetate resins, vinyl ether resins, halogen-containing resins, alicyclic olefin resins, polycarbonate resins, polyester resins, polyamide resins, cellulose derivatives, silicone resins and rubbers or elastomers. The thermoplastic resins are preferably amorphous and soluble in organic solvents (especially in common solvents that can dissolve plural polymers and curable compounds). In terms of the film-forming property, transparency, and weather resistance, particularly preferable are styrene resins, (meth)acrylic resins, alicyclic olefin resins, polyester resins, and cellulose derivatives (e.g., cellulose esters).

The antiglare layer may contain thermosetting resins.

The thermosetting resins are not limited, and examples thereof include phenol resins, urea resins, diallyl phthalate resins, melamine resin, guanamine resins, unsaturated polyester resins, polyurethane resins, epoxy resins, aminoalkyd resins, melamine-urea cocondensated resins, silicone resins, and polysiloxane resins.

The antiglare layer that contains inorganic fine particles, binder resins, and the aggregates of organic fine particles and has rod-shaped projections formed of the aggregates of organic fine particles is formed as follows. For example, a composition for an antiglare layer, which contains the organic fine particles and inorganic fine particles mentioned above, monomer components of binder resins (e.g., the above-mentioned ionizing radiation-curable resin), and photopolymerization initiators, is applied to a light-transmitting substrate. The applied composition is dried to be formed into a film, followed by curing of the film by ionizing radiation or the like.

In the composition for an antiglare layer, preferably, the organic fine particles do not form aggregates in the composition and form aggregates when formed into a film through application and drying of the composition. If the organic fine particles form aggregates in the composition for an antiglare layer, rod-shaped projections having axes that are randomly oriented cannot be formed. For achieving this, an appropriate amount of a solvent that is highly compatible with organic fine particles and has a high volatilization rate may be added to the composition.

In the case where rod-shaped projections are formed from rod-shaped fine particles mentioned above, when a composition for an antiglare layer which contains rod-shaped fine particles, instead of the organic fine particles, is applied, conditions should be set in such a manner that no shearing force is applied to the rod-shaped fine particles for the purpose of preventing alignment of the rod-shaped fine particles.

The photopolymerization initiators are not limited, and known initiators may be used. Specific examples thereof include acetophenones, benzophenones, Michler-Benzoyl benzoate, α-amyloxime esters, thioxanthones, propiophenones, benzyls, benzoins, and acylphosphine oxides. Further, photosensitizers are preferably mixed in the composition, and specific examples of the photosensitizers include n-butylamine, triethylamine, and poly-n-butylphosphine.

In the case where the ionizing radiation-curable resin is a resin system having a radical polymerizable unsaturated group, preferable examples of the photopolymerization initiators include acetophenones, benzophenones, thioxanthones, benzoin, and benzoin methyl ether. Each of these may be used alone or two or more of these may be used in combination. In the case where the ionizing radiation-curable resin is a resin system having a cationoic polymerizable functional group, preferable examples of the photopolymerization initiators include aromatic diazonium salts, aromatic sulfonium salts, aromatic iodonium salts, metallocene compounds, and benzoin sulfonate esters. Each of these may be used alone, or two or more of these may be used in combination.

The amount of the photopolymerization initiators in the composition for an antiglare layer is preferably 1 to 10 parts by mass based on 100 parts by mass of the ionizing radiation-curable resin. If the amount is less than 1 part by mass, an antiglare layer to be formed may have a poor hard-coating property. If the amount is more than 10 parts by mass, an antiglare layer to be formed may have lower transmissive visibility.

Preferably, the composition for an antiglare layer further contains a solvent.

The solvent is not limited, and examples thereof include water, alcohols (e.g., methanol, ethanol, isopropanol, butanol, benzyl alcohol), ketones (e.g., acetone, methyl ethyl ketone, methyl isobutyl ketone, cyclohexanone, cyclopentanone), esters (e.g., methyl acetate, ethyl acetate, propyl acetate, butyl acetate, methyl formate, ethyl formate, propyl formate, butyl formate), aliphatic hydrocarbons (e.g., hexane, cyclohexane), halogenated hydrocarbons (e.g., methylene chloride, chloroform, carbon tetrachloride), aromatic hydrocarbon (e.g., benzene, toluene, xylene), amides (e.g., dimethylformamide, dimethylacetamide, n-methylpyrrolidone), ethers (e.g., diethyl ether, dioxane, tetrahydrofuran), and ether alcohol's (e.g., 1-methoxy-2-propanol).

The raw material content (solid content) of the composition for an antiglare layer is not limited, and is commonly 5 to 70% by mass, and is preferably 25 to 60% by mass.

The composition for an antiglare layer may contain conventionally known additives such as dispersants, surfactants, antistatic agents, silane coupling agents, thickeners, anti-coloring agents, colorants (pigment, dye), defoamers, leveling agents, flame retardants, ultraviolet absorbers, tackifiers, polymerization inhibitors, antioxidants, surface modifiers, and lubricants, for the purpose of, for example, increasing the hardness of the antiglare layer, suppressing curing shrinkage, controlling the refractive index, or the like.

The composition for an antiglare layer may contain photosensitizers. Specific examples of the photosensitizers include n-butylamine, triethylamine, and poly-n-butylphosphine.

The method of preparing the composition for an antiglare layer is not limited, provided that components can be uniformly mixed. Exemplary methods include use of a known device such as a paint shaker, bead mill, kneader, or mixer.

The method of applying the composition for an antiglare layer to a light-transmitting substrate is not limited, and a known method may be used, such as spin coating, dipping, spraying, die-coating, bar-coating, a roll coater method, a meniscus coater method, a gravure reverse coater method, a slot die coater method, a reverse coater method, a roll coater method, a Meyer Bar method, a rod coater method, a lip coater method, flexo printing, screen printing, and a bead coater method.

In the present invention, the composition for an antiglare layer is preferably applied to a light-transmitting substrate by monolayer coating to form a film. The monolayer coating simplifies the production process and reduces the cost, and avoids risks caused by formation of a film by multilayer coating, such as reduction in the adhesiveness between the films formed earlier and the film formed later, generation of cissing, contamination, and entry of air. In addition, formation of a film by monolayer coating allows formation of a thinner antiglare layer, favorably preventing generation of cracks as defects caused during formation of the antiglare layer.

The method of drying the composition for an antiglare layer applied to a light-transmitting substrate is not limited, and exemplary methods include low pressure drying, heat drying, and a method employing the low pressure drying and heat drying in combination.

In the case where the organic fine particles in the composition for an antiglare layer are formed into aggregates during the drying, formation of the aggregates can be controlled by adjusting the heating temperature and the wind speed for drying.

Examples of the method of ionizing radiation for curing the film include use of light sources such as ultra-high pressure mercury lamps, high-pressure mercury lamps, low-pressure mercury lamps, carbon-arc lamps, black light fluorescent lamps, and metal halide lamps.

The ultraviolet light may have a wavelength within a range of 190 to 380 nm. Specific examples of electron beam sources include various electron beam accelerators such as Cockcroft-Walton type, Van de Graaff type, resonance transformer type, insulated core transformer type, linear type, dynamitron type, and high frequency type.

The thus formed antiglare layer preferably has a thickness of 2.0 to 7.0 μm. If the thickness is less than 2.0 μm, the antiglare layer may have only insufficient strength, resulting in a poor hard-coating property. If the thickness is more than 7.0 μm, the antiglare layer may have a poor bending property. In addition, cracks are likely to be formed during formation of the antiglare layer. Further, upon rolling the antiglare layer with contaminants included therein, cracks starting from the contaminants are likely to be formed in the antiglare layer. The lower limit of the thickness of the antiglare layer is more preferably 3.5 μm, and the upper limit thereof is more preferably 6.5 μm.

The thickness of the antiglare layer is measured with a confocal laser microscope (Leica TCS-NT, LEICA CAMERA AG, magnification of object lens: 10 to 100 times).

In the antiglare film of the present invention, predetermined rod-shaped projections as mentioned above form surface roughness on the surface of the antiglare layer. Specifically, the surface roughness preferably have a shape satisfying the following inequalities wherein Sm (mm) represents the average interval between projections and depressions on the antiglare layer surface, θa (deg) represents the average inclination angle of projections and depressions, and Rku represents the kurtosis of projections and depressions, from the standpoint of achieving both favorable contrast and suppression of scintillation. If the Sm is less than the lower limit or the θa is more than the upper limit, prevention of white muddiness or scintillation may be insufficient. If the Sm is more than the upper limit or the θa is less than the lower limit, reflection of external light cannot be suppressed, possibly causing problems such as insufficient antiglare property.

If the Rku is more than the upper limit, projections and depressions made by the top face of the rod-shaped projection (hereinafter, referred to as the plateau of projection) and/or the antiglare film surface other than the projection parts (hereinafter, referred to as the bottom face of the depressions) become too rough, causing white muddiness to lower the contrast. In addition, schintillation may be not sufficiently prevented. If the Rku is less than the lower limit, projections and depressions made by the plateau of the projection and/or the bottom face of the depression may be too flat, lowering the antiglare property.

0.10<Sm<0.35
0.15<θa<0.30
2<Rku<4

The Sm herein is obtained by the method in conformity with JIS B 0601-1994. The ea is a numerical value obtained based on the definition in the operation manual (revised on 20. July, 1995) of the surface roughness measuring instrument "SE-3400" (Kosaka Laboratory Ltd.), from the arc tangent of the sum of the projection heights $(h_1+h_2+h_3+\ldots+h_n)$ present at the standard length L ($\theta a=\tan^{-1}\{(h_1+h_2+h_3+\ldots+h_n)/L\}$) as illustrated in FIG. 1. The Rku is calculated from the following equation wherein n represents the number of data points in measurement of the height of projections and depressions and Yi represents the height at each point relative to the average surface, which are measured with a noncontact 3D surface profiler ("Zygo New View 6000" series from Zygo Corporation).

$$Rku = \frac{1}{n \cdot Rq^4} \sum_{i=1}^{n} Yi^4 \qquad \text{[Mathematical Expression 2]}$$

In the formula, Rq refers to the root mean square value and is represented by the following equation:

$$Rq = \sqrt{\frac{1}{n}\sum_{i=1}^{n} Yi^2} . \qquad \text{[Mathematical Expression 3]}$$

In the antiglare film of the present invention, the antiglare layer preferably has a surface skewness Rsk of larger than 0. If the Rsk is less than 0, the height distribution of the projections and depressions on the surface of the antiglare layer is concentrated on the higher side relative to the average plane. In such a case, the area occupied by the projections on the surface of the antiglare layer is less likely to be controlled within the above-mentioned range (20 to 40% per unit area). In addition, even if gentle projections are formed, formed projections are too large, leading to poorer prevention of scintillation. The Rsk is calculated from the following equation wherein n represents the number of data points in measurement of the height of projections and depressions and Yi represents the height at each point relative to the average surface, which are measured with a noncontact 3D surface profiler ("Zygo New View 6000" series from Zygo Corporation). The Rq is the value as described above.

$$Rsk = \frac{1}{n \cdot Rq^3} \sum_{i=1}^{n} Yi^3 \qquad \text{[Mathematical Expression 4]}$$

The antiglare film of the present invention preferably has a total light transmittance of at least 85%. In the case where the antiglare film of the present invention with a total light transmittance of less than 85% is applied to the surface of an image display device, the color reproducibility or visibility may be impaired. The total light transmittance is more preferably at least 90% and still more preferably at least 91%.

The antiglare film of the present invention preferably has a haze of less than 80%. The antiglare layer may have a haze derived from internal diffusion of fine particles contained therein and/or a haze derived from surface roughness formed on the outermost surface. The haze derived from internal diffusion is preferably not less than 0.3% but less than 79%, and more preferably not less than 1% but less than 50%. The haze on the outermost surface is preferably not less than 0.5% but less than 35%, more preferably not less than 0.5% and less than 20%, and still more preferably not less than 1% and less than 10%.

The antiglare film of the present invention preferably has a low refractive index layer on the antiglare layer for more favorably preventing white muddiness.

The low refractive index layer lowers the reflectance upon reflection of light from outside (e.g., fluorescent lamps, natural light) on the surface of an optical layered body. The low refractive index layer preferably comprises any of 1) a resin containing low refractive index inorganic particles, such as silica or magnesium fluoride, having a particle size of at most 100 nm, 2) a fluororesin that is a low refractive index resin, 3) a fluororesin containing low refractive index inorganic particles, such as silica or magnesium fluoride, having a particle size of at most 100 nm, 4) inorganic films formed of silica, magnesium fluoride and the like. The resin other than the fluororesin may be those used as the binder resin forming the antiglare layer mentioned above.

The thickness of $d_A$ of the low refractive index layer is not limited, and preferably satisfies the following formula (a):

$$d_A = m\lambda/(4n_A) \qquad (A)$$

wherein $n_A$ represents the refractive index of the low refractive index layer, m represents a positive odd number and preferably represents 1, and λ represents the wavelength and preferably represents a value within a range of 480 to 580 nm. In such a case, the reflectance is lowered because the effect of light interference is utilized.

The antiglare film of the present invention may appropriately include one or two or more other layers (e.g., antistatic layer, antifouling layer, adhesive layer, hard coat layer) provided that the effect of the present invention is not impaired. In particular, an antistatic layer and/or an antifouling layer are preferably formed. These layers may be similar to those of a known antireflection laminated body.

The antiglare film of the present invention is produced by forming an antiglare layer on a light-transmitting substrate using a composition for an antiglare layer which contains organic fine particles, inorganic fine particles, an ionizing radiation-curable resin, a solvent, and a photopolymerization initiator.

The composition for an antiglare layer and the method of forming an antiglare layer may be the same as the composition and the method mentioned in the above description on the method of forming the antiglare layer of the antiglare film.

The antiglare film of the present invention may be provided on the surface of a polarizing element in such a manner that the antiglare layer in the antiglare film is not in contact with the surface of the polarizing element, thereby producing a polarizer. Such a polarizer is one aspect of the present invention.

The polarizing element is not limited, and examples thereof include polyvinyl alcohol films, polyvinyl formal films, polyvinyl acetal films, and ethylene-vinyl acetate copolymer saponified film, which are preliminary dyed with iodine or the like and stretched. Before lamination of the optical layered body of the present invention on the polarizing element, the light-transmitting substrate (triacetylcellulose film) is preferably subjected to saponification. Saponification improves the adhesiveness and achieves the antistatic effect.

The present invention also relates to an image display device including the antiglare film or the polarizer.

The image display device may be a non-selfluminous image display device such as LCDs or a selfluminous image display device such as PDPs, FEDs, ELDs (organic EL, inorganic EL), or CRTs.

A LCD, a typical non-selfluminous display device, includes a light-transmitting display body and a light source for irradiating the light-transmitting display body from the backside. In the case where the image display device of the present invention is a LCD, the antiglare film or polarizer of the present invention is formed on the surface of the light-transmitting display body.

In the case where the image display device of the present invention is a liquid crystal display device including the antiglare film, light from the light source is emitted from underneath the optical layered body. In a STN-type liquid crystal display device, a retardation plate may be placed between the liquid crystal display element and the polarizer. Between respective layers of the liquid crystal display device, an adhesive layer may be optionally provided.

A PDP that is the selfluminous image display device is a device including a surface glass substrate (having an electrode formed on the surface) and a backside glass substrate (having an electrode and fine grooves on the surface, and having red, green, and blue phosphor layers formed in the fine grooves), wherein the surface glass substrate and the backside glass substrate face to each other and discharge gas is enclosed between the substrates. In the case where the image display device of the present invention is a PDP, the above antiglare film is provided on the surface of the surface glass substrate or on the front plate (glass substrate or film substrate).

The selfluminous image display device may be an image display device such as a CRT which converts electric signals to light to generate visible images, or an ELD device in which luminous substances (e.g., zinc sulfide or diamines which emit light upon application of a voltage) are deposited on a glass substrate and display is performed by controlling a voltage applied to the substrate. In this case, the above-mentioned image display devices have the above antiglare film on the outermost surface or on the surface of the front plate.

In either case, the image display device of the present invention may be used for driving a display of a TV, computer, electric paper, or the like. Especially, the image display device of the present invention is suitably used for display devices for high definition images, such as CRTs, liquid crystal panels, PDPs, ELDs, and FEDs.

Advantageous Effects of Invention

The antiglare film of the present invention has a configuration described above, and therefore has a thin antiglare layer, maintains the excellent hard-coating property and antiglare property, and sufficiently suppresses scintillation and white muddiness. Accordingly, the antiglare film provides high-contrast display images.

The antiglare film of the present invention is suitably used for cathode-ray tube displays (CRT), liquid crystal displays (LCD), plasma displays (PDP), electroluminescent displays (ELD), field emission displays (FED) or the like.

BRIEF DESCRIPTION OF DRAWINGS

FIG. 1 is an exemplary view for illustrating how to measure θa.

DESCRIPTION OF EMBODIMENTS

Figure 1:
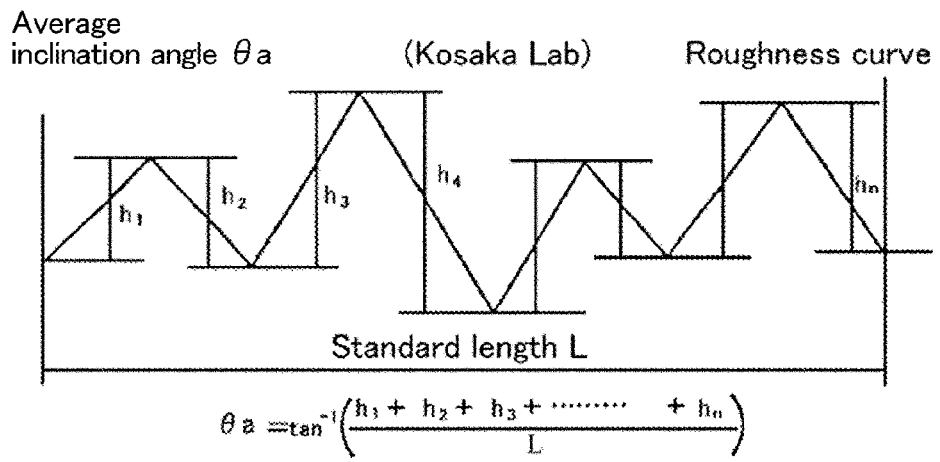

The present invention is described with reference to the following examples. However, the below embodiments do not limit the interpretation of the claimed invention. Unless otherwise specified, "part" and "%" are described based on mass.

Example 1

A composition for an antiglare layer containing the following components was prepared. The composition was applied to a triacetylcellulose film (TD80U, Fuji Photo Film Co., Ltd.) having a thickness of 80 μm, as a light-transmitting substrate, using a gravure reverse coater in such a manner that the cured film had a thickness of 5.0 μm. The applied composition was dried in an oven at 70° C. for 60 seconds and then irradiated with UV light at a dose of 120 mJ/cm$^2$ for curing thereof, thereby forming an antiglare layer. In this manner, an antiglare film was produced.
(Composition for an Antiglare Layer)

Binder resin (pentaerythritol tetraacrylate, NIPPON KAYAKU CO., LTD.) 40 parts by mass Binder resin (urethane acrylate, UV1700B, The Nippon Synthetic Chemical Industry Co., Ltd.) 60 parts by mass Organic fine particles (styrene-acrylic copolymer, XX245C, average particle size of 2 μm, refractive index of 1.515, SEKISUI PLASTICS CO., LTD.) 4 parts by mass Talc (nano talc D-1000, average particle size of 1 μm, NIPPON TALC CO., LTD.) 3 parts by mass Leveling agent (polyether-modified silicone oil, TSF4460, Momentive Performance Materials Inc.) 0.04 parts by mass Polymerization initiator (Irg184, BASF Japan) 6 parts by mass Solvent (toluene) 60 parts by mass Solvent (cyclohexanone) 40 parts by mass Example 2

An antiglare film was produced in the same manner as in Example 1 using a composition for an antiglare layer prepared in the same manner as in Example 1 except that the amount of the talc was changed to 1 part by mass.

Example 3

A composition for an antiglare layer was prepared in the same manner as in Example 1 except that the amount of the talc was changed to 6 parts by mass. Using the composition, an antiglare film was produced in the same manner as in Example 1 except that the thickness of the cured film was set to 5.5 μm.

Example 4

A composition for an antiglare layer was prepared in the same manner as in Example 1 except that the organic fine particles used were styrene-acrylic copolymers (SSX-42CSS, average particle size of 3.5 μm, refractive index of 1.545, SEKISUI PLASTICS CO., LTD.). Using the composition for an antiglare layer, an antiglare film was produced in the same manner as in Example 1 except that the thickness of the cured film was set to 6.0 μm.

Example 5

An antiglare film was produced in the same manner as in Example 4 using a composition prepared in the same manner as in Example 4 except that the amount of the talc was changed to 1 part by mass.

Example 6

An antiglare film was produced in the same manner as in Example 4 using a composition prepared in the same manner as in Example 4 except that the amount of the talc was changed to 6 parts by mass.

Example 7

A composition for an antiglare layer was prepared in the same manner as in Example 1 except that the amount of the organic fine particles was changed to 2 parts by mass and the amount of the talc was changed to 2 parts by mass. Using the composition for an antiglare layer, an antiglare film was produced in the same manner as in Example 1 except that the thickness of the cured film was set to 3.5 μm.

Example 8

A composition for an antiglare layer was prepared in the same manner as in Example 1 except that the amount of the talc was changed to 2 parts by mass. Using the composition for an antiglare layer, an antiglare film was produced in the same manner as in Example 1.

Example 9

First, a composition (A) for an antiglare layer was prepared in the same manner as in Example 4 except that the amount of the organic fine particles was changed to 15 parts by mass, and that the leveling agent was not added. Second, using the composition (A) for an antiglare layer, an antiglare layer (A) was produced in the same manner as in Example 4 except that the thickness of the cured film was set to 4.0 μm.

Next, a composition (B) for an antiglare layer was prepared in the same manner as in Example 1 except that the organic fine particles were not added and that the amount of the talc was changed to 6 parts by mass. Using the composition (B) for an antiglare layer, an antiglare film including a two-layered antiglare layer was produced by forming an antiglare layer (B) on the antiglare layer (A) in the same manner as in Example 1 except that the thickness of the cured film was set to 4.0 μm.

Comparative Example 1

An antiglare film was produced in the same manner as in Example 1, using a composition prepared in the same manner as in Example 1 except that the talc was not added.

Comparative Example 2

A composition for an antiglare layer was prepared in the same manner as in Example 1 except that the amount of the talc was changed to 9 parts by mass. Using the composition for an antiglare layer, an antiglare film was produced in the same manner as in Example 1 except that the thickness of the cured film was set to 6.0 μm.

Comparative Example 3

A composition for an antiglare layer was prepared in the same manner as in Example 4 except that the talc was not added. Using the composition for an antiglare layer, an antiglare film was produced in the same manner as in Example 4 except that the thickness of the cured film was set to 5.5 μm.

Comparative Example 4

A composition for an antiglare layer was prepared in the same manner as in Example 4 except that the amount of the talc was changed to 9 parts by mass. Using the composition for an antiglare layer, an antiglare film was produced in the same manner as in Example 4 except that the thickness of the cured film was set to 6.5 μm.

Comparative Example 5

A composition for an antiglare layer was prepared in the same manner as in Example 1 except that 7 parts by mass of inorganic fine particles (amorphous silica, average particle size of 1.5 μm, AX-204 Nipgel, TOSOH SILICA CORPORATION) was used instead of the organic fine particles and talc. Using the composition for an antiglare layer, an antiglare film was produced in the same manner as in Example 1 except that the thickness of the cured film was set to 1.5 μm.

Comparative Example 6

An antiglare film was produced in the same manner as in Comparative Example 5 except that the thickness of the cured film was set to 3.5 μm.

Comparative Example 7

A composition for an antiglare layer was prepared in the same manner as in Example 1 except that the amount of the organic fine particles was changed to 1 part by mass and the amount of the talc was changed to 0.5 part by mass. Using the composition for an antiglare layer, an antiglare film was produced in the same manner as in Example 1 except that the thickness of the cured film was set to 3.5 μm.

Comparative Example 8

An antiglare film was produced in the same manner as in Example 4 except that 3 parts by mass of inorganic fine particles (amorphous silica, average particle size of 1.5 μm, AX-204 Nipgel, TOSOH SILICA CORPORATION) was used instead of the talc and that the thickness of the cured film was set to 4.0 μm.

(Evaluation)

The resulting antiglare films were evaluated by the following methods. Table 1 shows the results.

(Evaluation of Projections)

Measurement was performed on the percentage of the area occupied by projections (area ratio), the ratio ($N_S/N_T$) between the number ($N_T$) of all projections and the number ($N_S$) of rod-shaped projections among all the projections, the ratio ($N_C/N_T$) between the number ($N_T$) of all projections and the number ($N_C$) of projections having an area of at least 500 μm$^2$ among all the projections, per unit area of the antiglare layer surface.

A randomly chosen site of the antiglare layer was measured with a 3D surface profiler ("Zygo New View 6000" series from Zygo Corporation) under the conditions of observation view: 0.55×0.55 mm, sampling interval: 1.119 μm, objection lens: ×10 magnification, and zoom lens: ×2 magnification. The surface shape to be removed was set as "Cylinder".

Based on the measurement, an image was produced in which the region where the inclination angle was at least 0.7° and the region where the inclination angle was less than 0.7° were colored differently using Zygo. The image was processed using image processing software "Image-Pro Plus" from Media Cybernetics for calculation of the major/minor axis ratio of an ellipse, angle, and area.

In calculation using Image-Pro Plus, spatial calibration (1.119 μm/pixel) was carried out for adjustment between the length of one pixel in the Zygo image and the value calculated by Image-Pro Plus.

The number of projections was calculated using a "Count/Size" command of Image-Pro Plus. The number of projections was counted under the following conditions of the outline style of "Filled", object options of "4-connected", "Fill Holes" and clean borders of "None" in the option menu of the "Count/Size" command, thereby sorting the projections.

The sorted projections were subjected to calculations of the above measurement items (area, area ratio, major/minor axis ratio of an ellipse, angle). Based on the results, the percentage of the area occupied by projections (area ratio), $N_S$, $N_T$, $N_C$, and angle, per unit area, were calculated. In calculation of each measurement item, data was extracted in accordance with the default filtering range (mentioned below).

<Filtering Range>

Area: 12.52161 to 12521610 μm$^2$, area ratio: 0 to 1, major/minor axis ratio of an ellipse: 1 to 1000000, angle: 0 to 180.

Figure 2:
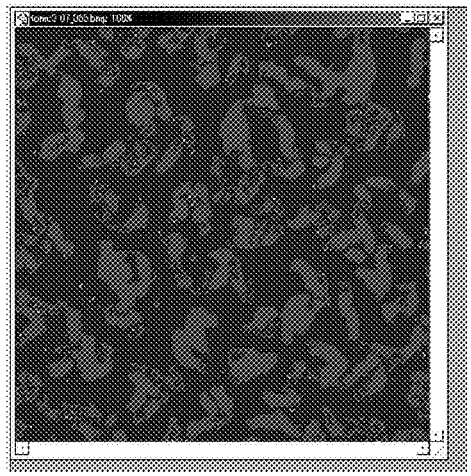
FIG. 2 is an image of the antiglare layer surface of an antiglare film according to Example 1.
Figure 3:
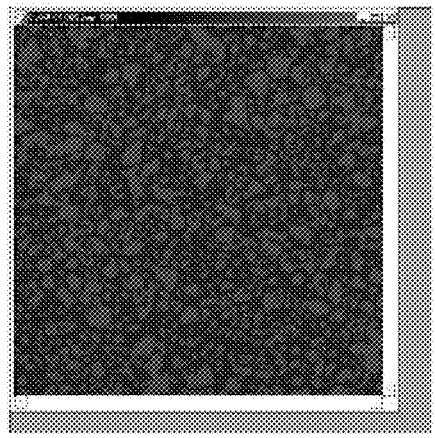
FIG. 3 is an image of the antiglare layer surface of an antiglare film according to Comparative Example 1.
Figure 4:
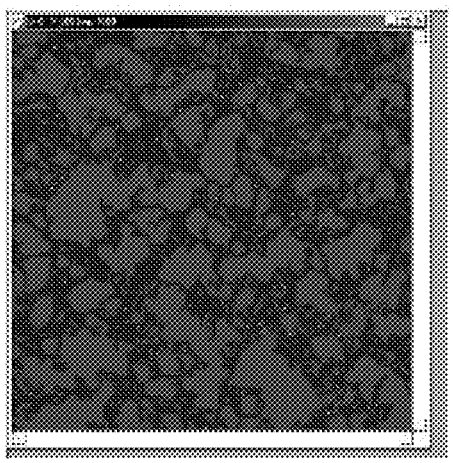
FIG. 4 is an image of the antiglare layer surface of an antiglare film according to Comparative Example 2.
Figure 5:
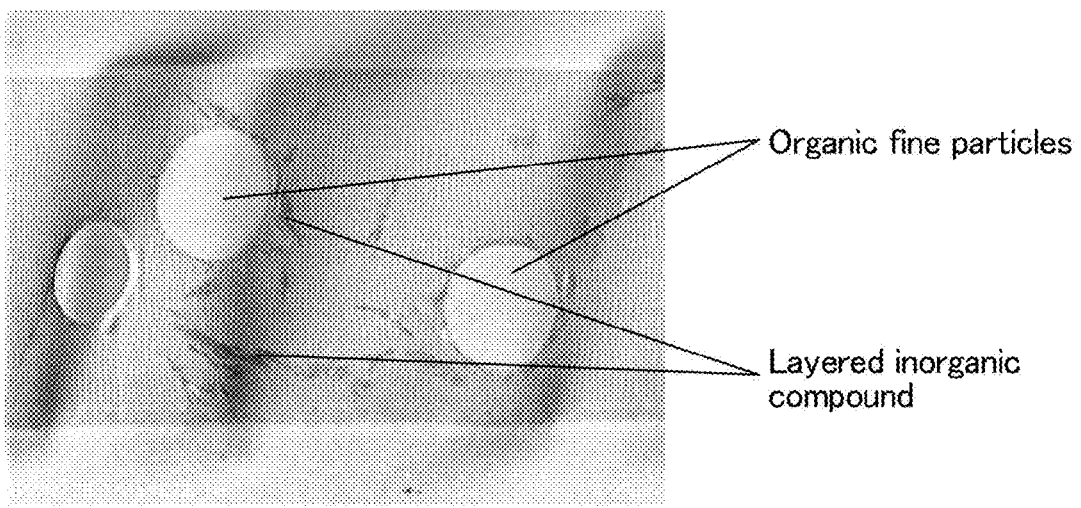
FIG. 5 is a STEM photo of a cross section of an antiglare film according to Example 1.

FIG. 2 illustrates an image of the antiglare layer surface of an antiglare film according to Example 1. FIG. 3 illustrates an image of the antiglare layer surface of an antiglare film according to Comparative Example 1. FIG. 4 illustrates an image of the antiglare layer surface of an antiglare film according to Comparative Example 2. FIG. 5 illustrates an STEM photo of a cross section of an antiglare film according to Example 1.

(Rku, Rsk)

The antiglare layer surface was measured with "Zygo New View 6000" series from Zygo Corporation in the same manner as in evaluation of projections. Then, using the same device, the Rku (kurtosis) and Rsk (skewness) were calculated.

(Sm)

The Sm (average interval between projections and depressions) was measured under the condition that the cutoff wavelength λc was set to 2.5 mm using a surface roughness measuring instrument "SE-3400" (Kosaka Laboratory Ltd.), in conformity with JIS B0601-1994.

(θa)

Using the surface roughness measuring instrument "SE-3400" (Kosaka Laboratory Ltd.), θa was measured under the same conditions as those employed in the measurement of the Sm.

(Scintillation)

The image display devices of 200 ppi and of 140 ppi each had the antiglare film applied to the outermost surface. The devices were placed in a room at an illuminance of about 1000 Lx and set to display white screens. The screens were visually observed for sensory evaluation at a distance of about 1.5 to 2.0 in from various angles, for example, from right and left and from above and below. Thus, sensory evaluation was performed to evaluate scintillation of the white screen display in accordance with the following criteria.

Good: no scintillation was found in the device of 200 ppi.
Fair: scintillation was found in the device of 200 ppi, and no scintillation was found in the device of 140 ppi.
Poor: scintillation was found in the device of 140 ppi.

(White Muddiness)

To the obtained antiglare film, a black acrylic plate was attached on the light-transmitting substrate side using an acrylic adhesive for an optical film (Hitachi Chemical Co., Ltd., "DA-1000" (product name)), thereby preparing a test sample. The sample was placed horizontally. A fluorescent lamp was set at a vertical position of 1.5 m distant from the sample, so that the fluorescent lamp was reflected on the sample. The sample was visually observed for sensory evaluation from various angles under the condition that the illuminance on the sample was set to 800 to 1200 Lx. Thus, sensory evaluation was performed to evaluate white muddiness in accordance with the following criteria.

Good: no white muddiness was observed, and the whole sample appeared black.
Fair: slight white muddiness was observed, but the whole sample still appeared black.
Poor: strong white muddiness was observed, and the whole sample appeared white.

(Film Thickness)

A cross section of the obtained antiglare film was observed under a confocal laser microscope (Leica TCS-NT, LEICA CAMERA AG, magnification of object lens: 10 to 100 times) to determine the presence of an interface and measure the thickness of the antiglare layer. Specifically, the thickness of the antiglare layer was measured in accordance with the following procedure.

<Measurement Procedure>

(1) For a vivid image without halation, a wet object lens was used in the confocal laser microscope and about 2 mL of oil having a refractive index of 1.518 was put on the antiglare film for observation. Oil was used to eliminate an air layer between the object lens and the optical layered body.

(2) The thickness of the maximum projection and the minimum depression on one screen (2 sites in total), from the light-transmitting substrate, were measured. The same measurement was performed for five screens, and 10 sites in total were measured. The average value thereof was regarded as the film thickness.

In the case where the interface is not clearly observed under a confocal laser microscope, the film may be cut with a microtome and the cross section thereof may be observed with an electron microscope (preferably of transmission type such as TEM and STEM) for calculation of the thickness.

(Hard Coat Property)

The pencil hardness of the antiglare film was measured in conformity with JIS K-5400 for evaluation of the hard-coating property.

A pencil hardness tester (TOYO SEIKI SEISAKUSHO, LTD.) was used for the measurement. The pencil hardness test was performed five times. In the case where no appearance defect was found in at least three tests out of five tests, the hardness of the used pencil was obtained. For example, in the case where no appearance defect was found in three tests among five tests using a 2H pencil, the pencil hardness of the optical layered body was regarded to be 2H.

When the antiglare film has a pencil hardness of at least 2H in the pencil hardness test, the antiglare film is regarded to have a hard-coating property.

(Evaluation of Cracks)

The antiglare sheet was wound around a mandrel used in a cylindrical mandrel method employed in the bending test in accordance with JIS-K-5600-5-1, for evaluation of cracks formed in accordance with the following criteria.

Good: no crack was formed when the sheet was wound around an 8-mm mandrel.
Fair: cracks were formed when the sheet was wound around an 8-mm mandrel, but no crack was formed when the sheet was wound around a 10-mm mandrel.
Poor: cracks were formed when the sheet was wound around a 10-mm mandrel (Antiglare Property)

To the antiglare film, a black acrylic plate was attached on the light-transmitting substrate side using an acrylic adhesive for an optical film (Hitachi Chemical Co., Ltd., "DA-1000" (product name)), thereby preparing a test sample. The sample was placed horizontally. A fluorescent lamp was set at a vertical position of 1.5 m distant from the sample, so that the fluorescent lamp was reflected on the sample. The sample was visually observed for sensory evaluation from various angles under the condition that the illuminance on the sample was set to 800 to 1200 Lx. Thus, sensory evaluation was performed to evaluate the antiglare property in accordance with the following criteria.

Good: the fluorescent lamp was reflected on the sample, but the outline thereof is blurred and not traceable.
Poor: the fluorescent lamp was reflected as if the sample was a mirror, and the outline (boundary of the outline) of the lamp is clearly seen.

TABLE 1

| | Ns/Nt (%) | Nc/Nt (%) | Area ratio (%) | Scintillation | White muddiness | Thickness | Hard coat property | Cracks | Antiglare property | The number of layers | Rku | Rsk | θs (deg) | Sm (mm) |
|---|---|---|---|---|---|---|---|---|---|---|---|---|---|---|
| Example 1 | 47.3 | 29.9 | 32.5 | Good | Good | 5.0 | 2H | Good | Good | 1 | 2.7 | 0.13 | 0.195 | 0.3098 |
| Example 2 | 55.1 | 26.6 | 23.3 | Good | Good | 5.0 | 2H | Good | Good | 1 | 2.5 | 0.11 | 0.247 | 0.1247 |
| Example 3 | 42.2 | 31.8 | 33.2 | Good | Good | 5.5 | 2H | Good | Good | 1 | 3.0 | 0.34 | 0.189 | 0.2587 |
| Example 4 | 52.2 | 34.3 | 31.8 | Good | Good | 6.0 | 2H | Good | Good | 1 | 3.6 | 0.77 | 0.202 | 0.3042 |
| Example 5 | 56.0 | 28.0 | 25.6 | Good | Good | 6.0 | 2H | Good | Good | 1 | 2.4 | 0.19 | 0.232 | 0.1462 |
| Example 6 | 37.0 | 41.0 | 37.8 | Good | Fair | 6.0 | 2H | Good | Good | 1 | 3.8 | 0.22 | 0.288 | 0.1336 |
| Example 7 | 45.1 | 30.2 | 27.8 | Good | Good | 3.5 | 2H | Good | Good | 1 | 2.6 | 0.15 | 0.214 | 0.2738 |
| Example 8 | 46.3 | 22.3 | 30.2 | Good | Fair | 5.0 | 2H | Good | Good | 1 | 2.9 | 0.24 | 0.132 | 0.5341 |
| Example 9 | 23.9 | 32.0 | 34.1 | Fair | Good | 8.0 | 2H | Fair | Good | 2 | 2.6 | −0.22 | 0.297 | 0.2383 |
| Comparative Example 1 | 16.2 | 11.5 | 38.3 | Fair | Poor | 5.0 | 2H | Good | Good | 1 | 3.6 | 0.38 | 0.251 | 0.1024 |
| Comparative Example 2 | 39.0 | 12.4 | 58.3 | Fair | Poor | 6.0 | 2H | Good | Good | 1 | 3.5 | 0.62 | 0.499 | 0.1732 |
| Comparative Example 3 | 18.4 | 27.5 | 60.1 | Poor | Poor | 5.5 | 2H | Good | Good | 1 | 3.2 | 0.47 | 0.342 | 0.0737 |
| Comparative Example 4 | 17.6 | 17.0 | 68.0 | Poor | Poor | 6.5 | 2H | Good | Good | 1 | 4.7 | 1.06 | 0.400 | 0.1504 |
| Comparative Example 5 | 0.0 | 100.0 | 99.8 | Poor | Poor | 1.5 | H | Good | Good | 1 | 5.2 | 1.09 | 3.014 | 0.1136 |
| Comparative Example 6 | 12.1 | 10.5 | 26.1 | Poor | Poor | 3.5 | 2H | Good | Good | 1 | 6.2 | 1.25 | 0.399 | 0.132 |
| Comparative Example 7 | 22.5 | 18.6 | 18.4 | Good | Good | 3.5 | 2H | Good | Poor | 1 | 2.1 | 0.07 | 0.142 | 0.3655 |
| Comparative Example 8 | 18.2 | 15.5 | 34.5 | Fair | Poor | 4.0 | 2H | Good | Good | 1 | 4.3 | 2.02 | 0.323 | 0.156 |

As shown in Table 1, each of the antiglare films according to the examples had rod-shaped projections formed favorably, and therefore was excellent in evaluations of scintillation, white muddiness, the hard-coating property, cracks, and the antiglare property. The antiglare films according to Examples 6 and 8 were slightly poor in prevention of white muddiness, because formation of rod-shaped projections was slightly insufficient (Example 6) or the area of large projections was slightly not enough (Example 8). The antiglare film according to Example 9 had a two-layered structure to be thicker, and therefore was slightly poor in prevention of cracks and scintillation.

In contrast, any of the antiglare films according to the comparative examples was not excellent in all the evaluations of white muddiness, scintillation, the hard-coating property, and the antiglare property.

INDUSTRIAL APPLICABILITY

The antiglare film of the present invention is suitably used in cathode-ray tube displays (CRT), liquid crystal displays (LCD), plasma displays (PDP), electroluminescent displays (ELD), field emission displays (FED), and the like.

The invention claimed is:

1. An antiglare film comprising:
a light-transmitting substrate; and
an antiglare layer that has surface roughness on a surface thereof and is provided on one surface of the light-transmitting substrate,
wherein the antiglare layer comprises inorganic fine particles, which comprise a layered inorganic compound,
the layered inorganic compound in the inorganic fine particles is at least one material selected from the group consisting of smectites, vermiculite, halloysite, kaolinite, endellite, dickite, talc, pyrophyllite, mica, margarite, white mica, bronze mica, tetra-silicic mica, taeniolite, antigorite, chlorite, cookeite, and nantite,
wherein the smectites are at least one material selected from the group consisting of montmorillonite, beidellite, nontronite, saponite, hectorite, sauconite, and stevensite,
the antiglare layer has plural rod-shaped projections having an aspect ratio of at least 2 on the surface of the antiglare layer having the surface roughness located at an opposite side to a surface contacting the light-transmitting substrate,
the rod-shaped projections are formed of a material comprising at least one material selected from the group consisting of rod-shaped fine particles and aggregates of organic fine particles,
$N_T$ indicating a number of all projections and $N_S$ indicating a number of the rod-shaped projections among the all projections, per unit area of the surface of the antiglare layer having the rod-shaped projections, satisfy following formula (1):

$$N_S/N_T > 0.2 \quad (1), \text{ and}$$

the all projections of the antiglare layer occupy from 20 to 40%, per unit area, of the surface of the antiglare layer at the opposite side to the surface contacting the light-transmitting substrate.

2. The antiglare film according to claim 1,
wherein the $N_T$ and the $N_S$ further satisfy following formula (2):

$$N_S/N_T > 0.4 \quad (2).$$

3. The antiglare film according to claim 1,
wherein the $N_T$ indicating the number of the all projections and $N_C$ indicating a number of projections having an area of at least 500 μm² among the all projections, per unit area of the surface of the antiglare layer at the opposite to the surface contacting the light-transmitting substrate, satisfy following formula (3):

$$N_C/N_T \geq 0.25 \quad (3).$$

4. The antiglare film according to claim 1,
wherein the plural rod-shaped projections of the antiglare layer formed on the surface at the opposite side to the surface contacting the light-transmitting substrate have their major axes randomly oriented.

5. The antiglare film according to claim 1,
wherein the antiglare layer has a thickness in a range from 2.0 to 7.0 μm.

6. A polarizer comprising a polarizing element,
which comprises the antiglare film according to claim 1, on a surface of the polarizing element.

7. An image display device comprising
the antiglare film according to claim 1, or a polarizer comprising a polarizing element, which comprises the antiglare film according to claim 1, on a surface of the polarizing element.

8. The antiglare film according to claim 1,
wherein the rod-shaped projections comprises the aggregates of organic fine particles.

* * * * *